United States Patent [19]

Haberland

[11] Patent Number: 4,679,993

[45] Date of Patent: Jul. 14, 1987

[54] FUEL INJECTION PUMP FOR INTERNAL COMBUSTION ENGINES

[75] Inventor: Siegfried Haberland, Stuttgart, Fed. Rep. of Germany

[73] Assignee: Robert Bosch GmbH, Stuttgart, Fed. Rep. of Germany

[21] Appl. No.: 853,316

[22] Filed: Apr. 18, 1986

[30] Foreign Application Priority Data

May 10, 1985 [DE] Fed. Rep. of Germany ....... 3516867

[51] Int. Cl.⁴ .......................... F04B 7/06; F16H 25/08

[52] U.S. Cl. .................................. 417/490; 74/22 R; 123/449; 417/500

[58] Field of Search ........................ 417/490, 492, 500; 74/22 R, 60; 123/449, 502

[56] References Cited

U.S. PATENT DOCUMENTS

| | | | |
|---|---|---|---|
| 3,107,631 | 10/1963 | Canfield | 74/22 R |
| 3,120,811 | 2/1964 | Jemison | 74/22 R |
| 3,381,615 | 5/1968 | Bailey | 74/22 R |
| 3,515,016 | 6/1970 | Jemison | 74/22 R |
| 4,026,196 | 5/1977 | Olofsson | 74/22 R |
| 4,436,163 | 3/1984 | Simpson | 74/22 R |
| 4,531,897 | 7/1985 | Orlita | 417/500 |

OTHER PUBLICATIONS

Bosch—Distributor Fuel-Injection Pump Technical Instruction—VDT—U 2/2 En (12.83).

*Primary Examiner*—Carlton R. Croyle
*Assistant Examiner*—Jane E. Obee
*Attorney, Agent, or Firm*—Edwin E. Greigg

[57] ABSTRACT

A fuel injection pump is disclosed in which the stroke disk of a rotating and reciprocating pump and distributor piston is supported on a rotatable roller ring. The roller ring is axially supported such that it slides on a support ring. In order to assure good lubrication of the supporting face of the support ring, the support ring has a plurality of flutes or grooves extending radially in its face oriented toward the roller ring. The grooves communicate with a radial conduit that is formed by an undercut or chamfer in the support ring.

3 Claims, 3 Drawing Figures

FUEL INJECTION PUMP FOR INTERNAL COMBUSTION ENGINES

BACKGROUND OF THE INVENTION

The invention relates to improvements in a fuel injection pump for internal combustion engines having a distributor member which both rotates and reciprocates.

In a known fuel injection pump of this type, the distributor member has a housing including a stationary support part having a supporting face, which is embodied as a ring; the ring rotatably supports a roller ring, which has a large number of indentations, disposed in a sort of waffle pattern, for retaining fuel as a lubricant. Because the fuel that enters the indentations remains trapped there, its lubricating ability is very vulnerable to deterioration by soiling. Furthermore, the total area of the indentations considerably reduces the load- bearing area of the supporting face.

OBJECT AND SUMMARY OF THE INVENTION

It is a principal object of the invention to provide a fuel injection pump having the advantage over the prior art that a better delivery of fuel into the vicinity of the supporting face effects better lubrication and thus better sliding movement of the roller ring on the support part.

It is another object of the invention that the radial grooves be well flooded so that the sliding action not be vulnerable to deterioration by soiling.

It is still another object of the invention that because less material is removed from the supporting face of the support ring, the load-bearing area of the support ring is increased, and thus the pressure exerted per unit of area is reduced below that prevailing in the prior art applications.

It is yet another object and a particularly advantageous feature of the invention that the lubricating flutes be embodied as grooves of rectangular cross section, in which particularly good flooding with fuel is attained, yet only minimally reducing the loadbearing portion of the supporting surface of the support ring.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
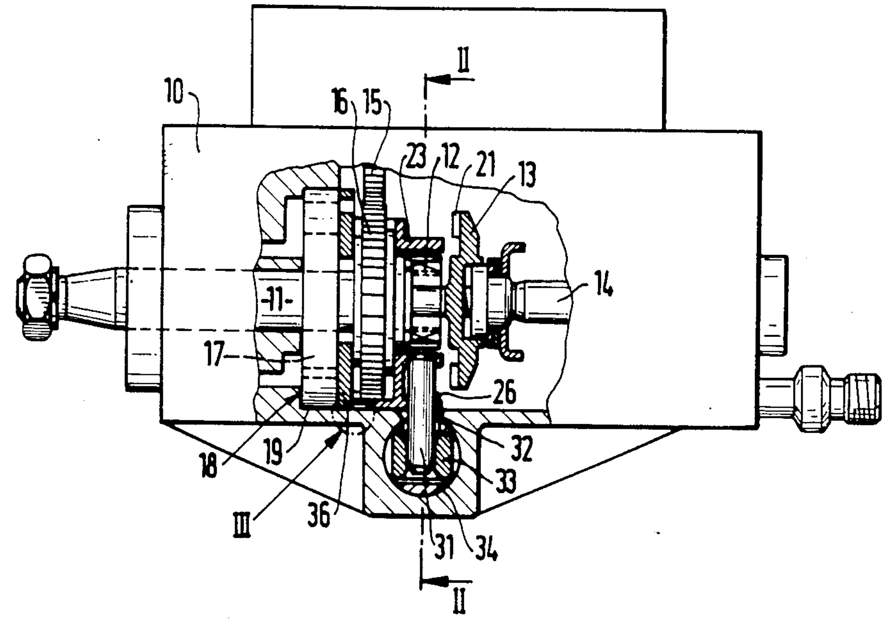
FIG. 1 shows a distributor-type fuel injection pump for internal combustion engines in simplified form, in a partially cutaway side view.

A drive shaft 11 is rotatably supported in a housing 10 of the fuel injection pump and via a cross slide coupling 12 it causes a stroke disk 13 and a distributor piston 14 to rotate. In the vicinity of its power take-off end, the drive shaft 11 has a gear wheel 16, meshing with a pinion 15 of an rpm governor, and a rotor 17 of a feed pump 18 that feeds fuel into the interior of the housing

10. The annular stator 19 of the feed pump 18 is fixed inside a recess of the housing 10.

Figure 2:
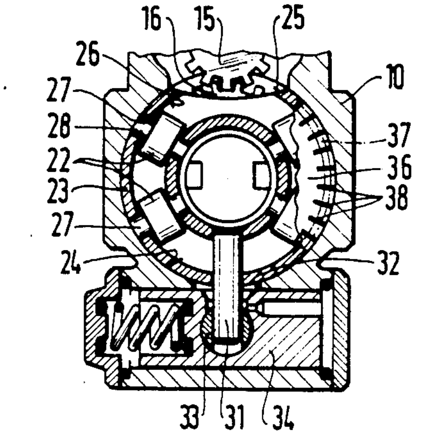
FIG. 2 shows the distributor injection pump of FIG. 1 in a cross section taken along the plane II—II of FIG. 1.
Figure 3:
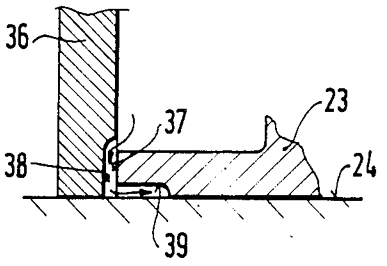
FIG. 3 shows a detail, marked III in FIG. 1, on a larger scale.

To superimpose a stroke movement on the rotary movement of the distributor piston 14, the stroke disk 13 has cams 21 on its face oriented toward the cross slide coupling 12. The cams 21 rest on rollers 22 of a roller ring 23 surrounding the cross slide coupling 12 and the gear wheel 16. Referring now to FIG. 2, the roller ring 23 is supported in a cylindrical recess 24 of the housing 10 such that it can rotate to a predetermined angular extent; this recess 24 is open toward the rpm governor having the pinion 15. In this vicinity, the roller ring 23 has a curved machined recess 25, through which the pinion 15 that meshes with the gear wheel 16 extends. The four diagonally arranged rollers 22 are distributed in an axial groove 26 of the roller ring 23 that is open toward the stroke disk 13 and are rotatably supported on bolts 27 located in axial, radially extending recesses 28. For rotation of the roller ring 23, a radially offstanding bolt 31 is inserted into the roller ring, on the side opposite the machined recess 25. The bolt 31 extends through an aperture 32 in the housing 10 into a ball sleeve 33 of an adjusting piston 34. Depending upon the pressure exerted on the adjusting piston 34, the roller ring 23 is rotated in the recess 24 via the bolt 31 to a larger or smaller angular extent, so that the stroke of the distributor piston 14 is phase-offset.

The stroke disk 13, which is pre-loaded on the distributor piston 14 by restoring springs, not shown, acts to press the roller ring 23 axially against a support ring 36, which is likewise placed in the recess 24 of the housing 10 and rests on the stator 19 of the feed pump 18. The roller ring 23 rests axially with its face-end supporting surface 27 on the facing side of the disk-like support ring 36. The annular supporting face 37 is very narrowly interrupted, in the vicinity of the machined recess 25, by a recess for receiving the gear wheel 16.

To assure good lubrication for the sliding of the roller ring 23 on the support ring 36, the support ring 36 has a plurality of radially extending grooves 38 at equal intervals in its side facing the supporting face 37 of the roller ring 23. Preferably the grooves 38 are spaced apart by 10° angles and are approximately 0.5 mm wide and 0.5 mm deep. To assure thorough flooding of the grooves 38 with fuel, the roller ring 23 has a chamfer or undercut 39 in the vicinity of its supporting face 37; together with the housing 10 and the support ring 36, this chamfer forms a drainage conduit for the fuel. By delivering fuel, as a lubricant, into the vicinity of the supporting face 37 of the roller ring 23, good lubrication and hence easy sliding of the roller ring 23 on the support ring 36 when the roller ring 23 rotates is attained. Because of the relatively narrow grooves 38, a favorable pressure per unit of area is attained despite the high load.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A fuel injection pump for internal combustion engines, in particular a distributor injection pump, comprising a pump and distributor member that both reciprocates axially and simultaneously rotates within a housing and is rotatably connected to a drive shaft via a coupling, said pump and distributor member further having a cam stroke disk provided with cams arranged to be driven by a drive shaft via a roller ring, said roller ring being rotatable in the housing about a predetermined angle coaxially with the drive shaft and having roller ring rollers through which the cam stroke disk cams are driven, said housing being provided with a stationary support ring which axially supports the roller ring, said stationary support ring having an axis and being provided on a surface thereof which rests on the roller ring with indentations embodied as flutes extending radially with respect to the axis of the stationary support ring.

2. A fuel injection pump as defined by claim 1, further wherein the flutes comprise grooves having a rectangular cross section.

3. A fuel injection pump as defined by claim 2, further wherein the roller ring has a face resting on the stationary support ring and said face is undercut to provide chamfers therein, whereby said grooves and said chamfers cooperate to allow fuel to pass therethrough to better lubricate said roller ring and said stationary support ring.

* * * * *